May 28, 1963
D. W. NORWOOD
3,091,166
PHOTOGRAPHIC DEVICE RESPONSIVE TO BOTH
INCIDENT AND REFLECTED LIGHT
Filed Dec. 7, 1959
2 Sheets-Sheet 2
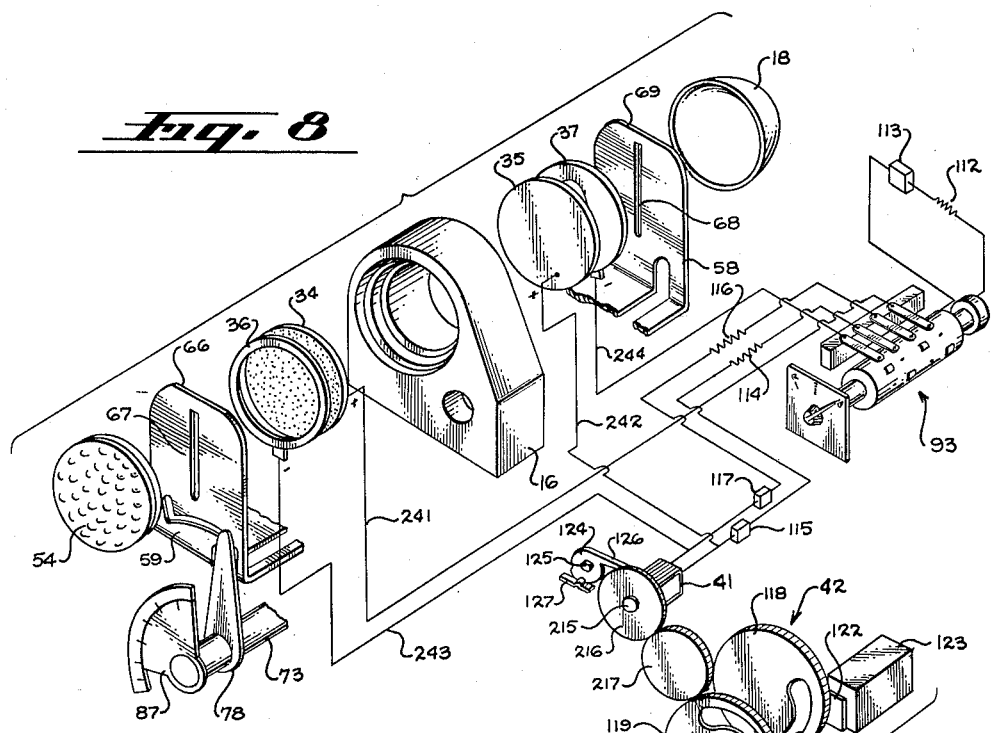
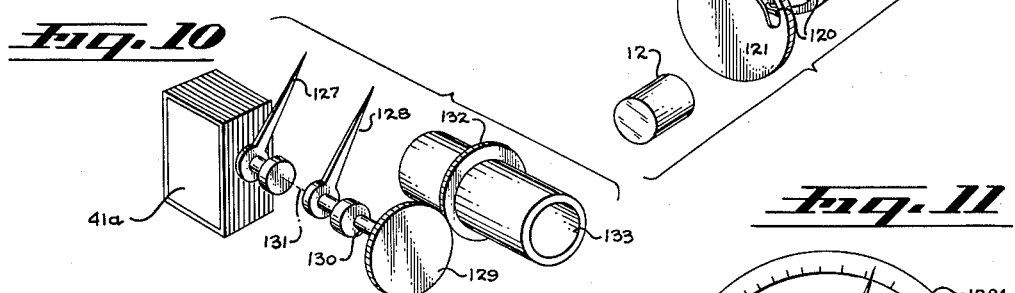
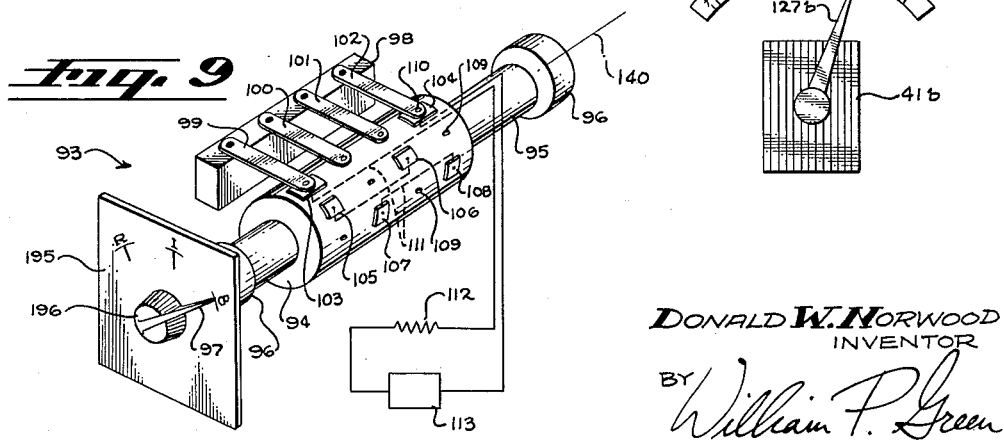
DONALD W. NORWOOD
INVENTOR
BY William P. Green
ATTORNEY 3,091,166
PHOTOGRAPHIC DEVICE RESPONSIVE TO BOTH
INCIDENT AND REFLECTED LIGHT
Donald W. Norwood, 1470 San Pasqual St.,
Pasadena, Calif.
Filed Dec. 7, 1959, Ser. No. 857,959
10 Claims. (Cl. 95—64)

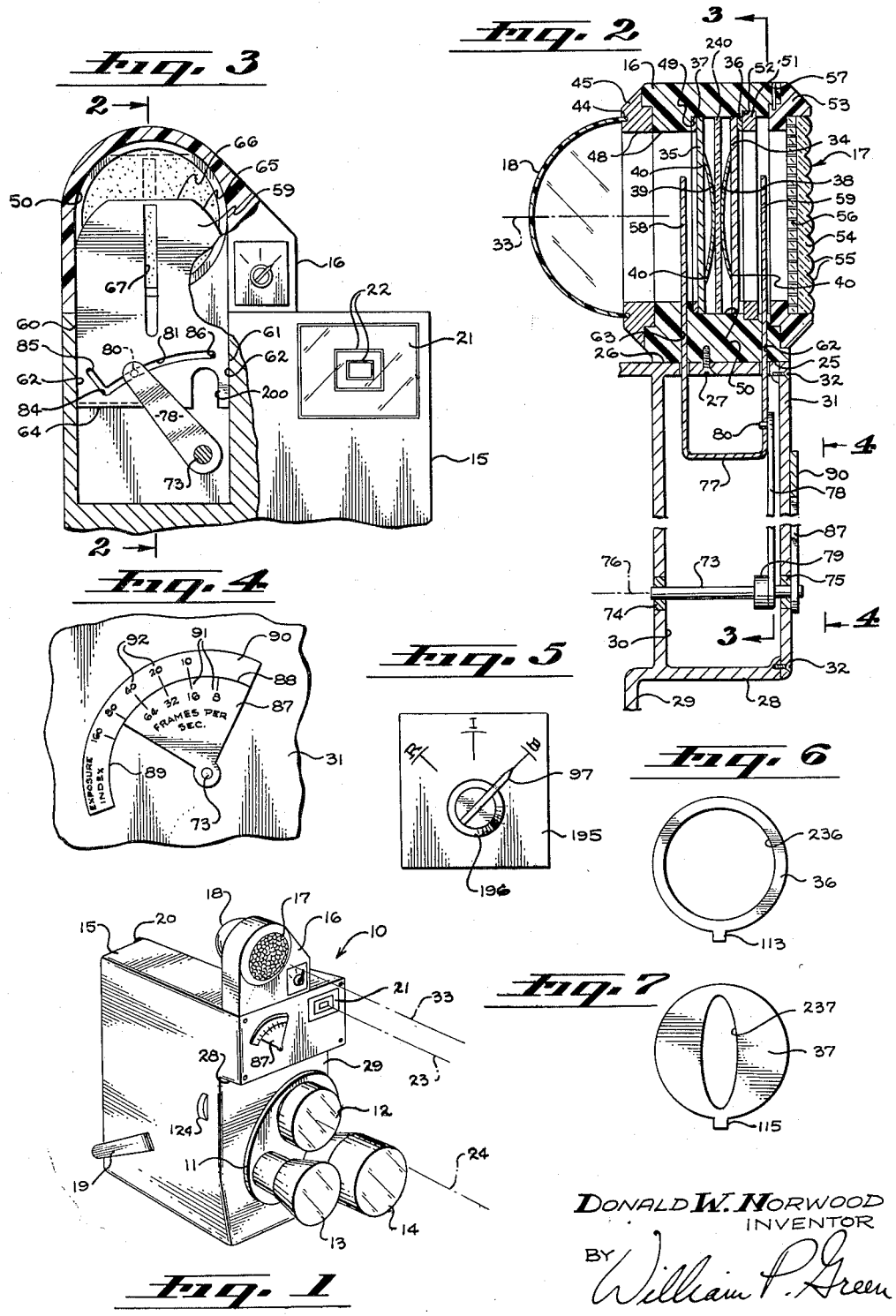

This invention relates to improved light responsive apparatus for use in photographic exposure control. In its broadest aspects, it is contemplated that the present invention is applicable to either an indicator type light responsive device, such as an exposure meter, or an automatic or semi-automatic camera in which the light responsive apparatus actually controls the f-stop setting of the camera lens. Certain features of the apparatus described in the present application have been shown and claimed in my copending application Serial No. 829,873, filed July 27, 1959, on "Light Responsive Camera."

The wide variation in composition of the many different types of photographic scenes which may be encountered renders it very difficult to provide a light meter or automatic camera which will respond properly to all of these various different types of scenes in a manner assuring optimum exposure of the film and picture quality in all situations. A great deal of the difficulty which has heretofore been encountered has been caused by differences in composition as between a foreground subject and the background in a particular scene. For instance, the foreground subject (usually a person or persons) may be composed chiefly of very light tones, while the background may be of darker tones, or vice versa. In such situations, it is difficult to arrive at a proper setting for the lens aperture which will produce optimum exposure of the scene elements which are of primary importance.

The situation is made even more complex by the various different arrangements of lighting which may be encountered, that is, front-lighting, side-lighting, or back-lighting. The numerous possible combinations of scene compositions and the various different arrangements of illumination thus combine to present a vast array of circumstances with which the exposure control apparatus must cope.

As is well known, there have in the past been utilized two basically different types of light meter devices for use in photographic work. Specifically, some light meters have been of the incident light type, in which the meter measures and responds to the amount of light which illuminates or is incident at the photographic scene; while other light meters have been of the reflected light type, responding to the amount of light which is reflected from the scene toward the camera location. Of these two types of light responsive devices, the incident light arrangement has proven far superior to reflected light apparatus for almost all uses. The only situations in which incident light apparatus is not superior are those in which it is impossible or inconvenient to measure the light incident at the scene, as for instance when it is desired to take a photograph out of the window of an airplane in flight. In an unusual case of this type, reflected light apparatus must be used, in spite of its known limitations.

Though the incident light type of measurement is far superior to a reflected light measurement in every instance in which it is possible to take an incident light reading, there are some situations in which, though an incident light reading can be taken, even that type of reading can not by itself be relied upon to establish an optimum exposure setting. This is true for example when the scene to be photographed has a large area of unusually light tones in the background. Use of a reflected light measurement in such a case may result in a serious underexposure of the foreground subject, because the reflected light apparatus is unduly influenced by the large background area. Use of an incident light measurement in such a situation may result in a slight overexposure of the background. Special treatment of this situation is therefore required. Formerly, this was accomplished by a photographer's deliberate modification of the lens aperture setting indicated by the incident light device, following the photographer's mental estimate of the amount of modification suitable for the situation at hand. The same type of mental alteration of the indicated lens aperture setting must be made in a situation where the background is unusually dark.

A major object of the present invention is to provide a light responsive device which will itself automatically compensate for any such light background or dark background situation, so that it is no longer necessary for the photographer to mentally alter the reading given by a meter. In this way, the overall process of photographing an unusual scene is considerably simplified, and the necessity for expert mental appraisal of a scene is eliminated.

This result is accomplished in a very unique manner by the provision of apparatus which allows for the measurement simultaneously, in a single device, of both incident light and reflected light. A single electrically operated microammeter or the like is rendered simultaneously responsive to both an incident light actuated photoelectric cell, and a reflected light photoelectric cell, so that the actuation of the electrically operated unit is controlled in part by each of these cells. The microammeter or its equivalent then functions to actuate the pointer of a light meter, or the iris mechanism of an automatic camera, so that the pointer or iris is responsive to both incident light and reflected light. The two light responsive cells may be connected in series to the microammeter, and are desirably of the photovoltaic type.

When a double cell arrangement of this type is employed, it is found that the reflected light cell will automatically modify or alter the output of the incident light cell in a manner compensating for any variation of the scene from an ideal or optimum photographic scene (overall reflectance of 18 percent, medium tone foreground, medium tone background, illuminated by front light, and light incident at camera same as at scene). When this ideal type of scene is encountered, the reflected light cell does not alter the reading produced by the incident light cell, and therefore the same reading is given as if an incident light device were employed by itself.

A further object of the invention is to provide a light responsive device which in one condition will respond in the above discussed manner to both incident light and reflected light simultaneously, but which can also be adapted, when desired, to respond only to incident light or only to reflected light separately. For this purpose, I may utilize a switching circuit which is actuable to three different settings, to selectively connect the microammeter to either the incident light cell, or the reflected light cell, or both simultaneously. In this way, the device can be adapted to meet all possible photographic conditions which may be encountered.

The above and other features and objects of the present invention will be better understood from the following detailed description of the typical embodiments illustrated in the accompanying drawings, in which:

FIG. 1 is a perspective view showing an automatic camera constructed in accordance with the invention;

FIG. 2 is an enlarged vertical section through the light pick-up head of the FIG. 1 camera;

FIG. 3 is a somewhat reduced section taken on line 3—3 of FIG. 2;

FIG. 4 is a fragmentary front view taken on line 4—4 of FIG. 2;

FIG. 5 is an enlarged front view of the selector knob of the camera;

FIGS. 6 and 7 are views showing the two front contacts of the two light responsive cells respectively;

FIG. 8 is an exploded perspective view, partially diagrammatic, showing the light responsive apparatus in the camera;

FIG. 9 is an enlarged perspective view of the selector switch of the camera;

FIG. 10 is a perspective view representing fragmentarily a semi-automatic form of camera embodying the invention; and FIG. 11 is a view representing a light meter embodying the invention.

With reference first to FIGS. 1 through 9, and particularly FIG. 1, I have shown at 10 a motion picture camera, typically having a rotary turret 11 at its forward end carrying three lenses 12, 13 and 14 adapted to be selectively moved to active picture taking position. The housing of the camera includes a main relatively large portion 15 containing the bulk of the mechanism of the camera, and carrying a reduced dimension upwardly projecting housing portion 16 to which a reflected light acceptance unit 17 and an incident light acceptance unit 18 are mounted. The mechanism contained within main body section 15 of course includes the usual film advancing mechanism for successively advancing different frames of a motion picture film to a predetermined position of exposure to an image received through the active one of the three lenses 12, 13 and 14. Also there is contained within main housing portion 15 the usual shutter mechanism, power operated in timed relation to the actuation of the film advancing mechanism to open the light path from the lens to each frame of the film when that particular frame is in proper position for exposure. The spring actuated motor for driving the film advancing mechanism and shutter mechanism is windable by the usual winding arm represented at 19. For indicating to a user exactly what pacture is to be taken by the camera when the camera is aimed in a particular direction, there is provided the usual view finder, having an eye piece 20 at the rear end of the camera into which the operator looks, and having a viewing window 21 at the forward end of the camera facing in the same direction as the lens, and typically having different rectangular areas 22 (see FIG. 3) marked off in this transparent viewing window for use with the different lenses. In Fig. 1 the viewing axis of the view finder is represented at 23, and is approximately parallel to the viewing axis 24 of the lens 12 which is located in active position.

The main portion 15 of the camera housing normally takes the form of a hollow metal casting, or an assembly of metal parts, with the upwardly projecting portion 16 of the housing desirably being a separately formed element, typically made of a suitably rigid, opaque resinous plastic material, such as Bakelite (phenol-formaldehyde). As is seen clearly in FIGS. 2 and 3, the upwardly projecting reduced dimension housing part 16 may have a horizontal planar undersurface 25 resting on a horizontal planar upper surface 26 of main housing part 15, with element 16 being secured to the main housing in any suitable manner, as by a number of retaining screws one of which is represented at 27 in FIG. 2. The portion 28 of housing part 15 to which upper part 16 is attached may project forwardly beyond the vertical plane of the rest of the front wall 29 of the camera, and may form within forwardly projecting rectangular portion 28 of the housing, a typically rectangular inner chamber or space 30 within which there is mounted certain mechanism for coaction with the apparatus contained within upper light collecting head 16. Any suitable means may be provided for allowing access to the interior of chamber 30 during manufacture or assembly of the apparatus, as by forming the front wall 31 of portion 28 separately, and removably attaching it to the rest of portion 28 by screws represented at 32.

The upper light receiving head 16 has a passage extending entirely therethrough and centered about an axis 33 which is parallel to axis 24 of the lens 12 which is in active position. Within this passage in head 16 there are positioned two oppositely facing photoelectric cells 34 and 35 associated with the two light acceptance units 17 and 18 respectively. These cells 34 and 35 may both take the form of circular photovoltaic discs, desirably of the same diameter, and adapted to produce an output current in response to the impingement of light upon the discs. Reflected light cell 34 has its sensitive side facing axially along axis 33 in the same direction in which lenses 12, 13 and 14 face (to the right as seen in FIG. 2). The incident light responsive cell 35, on the other hand, faces in exactly the opposite axial direction, to the left as seen in FIG. 2. The electrical connections to these sensitized light responsive sides of cells 34 and 35 are effected by means of two electrically conductive metal rings 36 and 37 (FIG. 2), which engage the periphery of the sensitive surfaces of the discs. As is seen clearly in FIGS. 6 and 7, both of these discs are externally circular and of an external diameter corresponding to that of cells 34 and 35, but with short tabs 113 and 115 being formed on elements 36 and 37 for connection to associated electrical leads. Internally, ring 36 forms a circular light passing opening 236, while ring 37 forms a vertically elongated essentially oval or oblong light passing aperture 237. The material of rings 36 and 37 is itself opaque, to block off the admission of light to the contacted portions of discs 34 and 35, so that the effective size of disc 34 is substantially less than the size of disc 35 by reason of the masking effect of element 37, whose aperture 237 is smaller than aperture 236.

The electrical connections to the other sides of the cells 34 and 35 are made by means of two resilient metal electrically conductive springs 38 and 39, which may have peripheral fingers at 40 abutting against discs 34 and 35, and which springs 38 and 39 may be separated by means of an insulative disc 240. The two springs 38 and 39 are connected to a pair of electrical leads 241 and 242, which extend through suitable passages provided in body 16, and the latter of which connects to the positive side of a conventional moving coil type of electrically actuated micro-ammeter unit 41 (see FIG. 8) for actuating the iris mechanism 42 of the camera in accordance with the light energization of the photoelectric cells 34 and/or 35.

The incident light collector unit 18 preferably is a substantially hemispherical translucent dome, centered about a point on axis 33 and facing along that axis in a leftward direction as seen in FIG. 2. In such a position the three-dimensional hemispherical light collector will be correctly oriented, with respect to the camera-subject axis and the keylight-subject axis, to represent the camera-side of a three-dimensional photographic subject. Dome 18 may be formed of a suitable translucent resinous plastic material, such as cellulose acetate. The annular base portion 44 of dome 18 is rigidly cemented or otherwise attached to an opaque mounting ring 45, typically formed of metal. Ring 45 is cemented or otherwise secured in any manner to mounting head 16, in the relation shown.

Axially inwardly of the incident light collecting dome 18, ring 45 and head 16 contain aligned cylindrical inner surfaces 48, centered about axis 33, and define a circular passage for passing light from dome 18 to the light sensitive side of photoelectric cell 35. At the forward end of the surface 48 in part 16, the part 16 forms an annular forwardly facing transverse shoulder 49, against which contact ring 37 abuts, with disc 35 then being pressed axially against ring 37 by spring contact 39. Discs 34 and 35, rings 36 and 37, and insulative disc 240, are all contained within, and correspond in diameter to, an enlarged diameter cylindrical counterbore 50 formed in part 16 and centered about axis 33. At the forward side of the masking ring or contact element 36, there is provided a resilient snap ring or split ring 51, which is adapted to be received within an annular groove 52 in part 16 to retain all of the elements 34, 35, 36, 37, 38, 39, and 240 in their illustrated FIG. 2 positions within the interior of part 16. As will be apparent, snap ring 51 is interrupted at one point about its circular extent, so that the ring may be constricted to allow its insertion into part 16 and into groove 52 thereof, but with the resilience of ring 51 then being such as to expand the ring tightly into groove 52 to retain it therein. At the forwardmost end of part 16, there is provided a ring 53, centered about axis 33, and carrying the reflected light acceptance unit 17. Unit 17 may include a conventional multi-lenticular light acceptance disc 54 disposed transversely of axis 33, and formed of transparent glass or the like molded to present a large number of small convex lens areas 55 facing forwardly along axis 33. Behind disc 54 there may be provided the usual circular honeycomb element 56, containing a large number of parallel axially extending passages through which light is directed in a manner assisting element 54 in narrowing the acceptance angle of the overall unit 17 to a proper angle for reflected light readings. Parts 54 and 56 may be cemented to ring 53, and this ring may in turn be rigidly secured in any manner to part 16, as by a number of circularly spaced retaining pins, one of which is represented at 57 in FIG. 2. As will be understood, the illustrated manner of construction of the apparatus contained within head 16 allows all of the parts 34, 35, 36, 37, 38, 39, 51, and 240 to be inserted axially into head 16 from its forward side, being retained therein by ring 51, following which ring 53 and the carried reflected light acceptance unit 17 may be attached to part 16 to complete the assembly.

Axially between incident light collector unit 18 and the associated photoelectric cell 35, there is provided a light valve element 58 (see FIGS. 2 and 8) for regulating the percentage of the available light which is permitted to pass from collector unit 18 to cell 35. Similarly a second light valve element 59 is provided axially between reflected light collector unit 17 and its associated photoelectric 34. Both of these valves 58 and 59 may take the form of opaque planar sheet metal plates disposed transversely of axis 33, and each mounted for sliding movement within the plane of that particular plate and therefore transversely of axis 33. When these valves 58 and 59 are in their uppermost positions, a minimum amount of light is permitted to pass the valves and impinge upon cells 34 and 35. To pass more light to the cells, valves 58 and 59 are slidable downwardly, ultimately to their lowermost positions in which no portion of either of the two discs 34 and 35 is covered by valve element 58 or 59.

Referring now to FIG. 3, the valve plate 59 has two vertically extending parallel opposite side edges 60 and 61 which are spaced apart in correspondence with the width of a vertical guideway 62 formed in the lower portion of part 16, within which guideway plate 59 is mounted for only vertical movement. The bottom of plate 59 may be defined by a horizontal bottom edge 64, while the top of plate 59 is defined by an essentially semi-circular edge 65, which is interrupted at 66 by a horizontal top edge defining a chord of the semi-circle represented by edge 65. This semi-circular edge 65 may have a radius corresponding substantially to that of the counterbore 50 in part 16, and may be engageable upwardly against a portion of that counterbore in the uppermost position of valve 59. In that uppermost position of the valve, the top edge 66 (see broken lines in FIG. 3) is located slightly below the top of the unmasked portion of disc 34, to allow some light to pass the valve and impinge upon the cell 34 in even the most closed position of the valve. There may also be a vertically extending slit 67 formed in plate 59, to allow some additional light to pass the valve and impinge upon the photoelectric cell in the uppermost position of the valve. This slit 67 acts to improve the distribution of light over the area of the cell in the minimum light transmission condition. As the plate 59 is moved downwardly, the effective light passing area of the valve is increased as seen in FIG. 3. As will be apparent, the width of valve plate 59 between its opposite side edges 60 and 61 is slightly greater than the diameter of the exposed portion of the associated photoelectric cell 34, and corresponds essentially to the diameter of counterbore 50, and to the diameter of curvature of the upper interrupted arcuate edge 65.

The second valve plate 58 may be considered as being essentially the same as valve plate 59, except that valve 58 is slightly narrower and its upper curved portion is of slightly smaller radius, in order to fit within the bore 48 rather than counterbore 50. The top horizontal edge 69 of valve 58 may be in exact axial alignment with, and exactly equivalent to the corresponding edge 66 of valve 59, and similarly aperture 68 may be aligned with aperture 67 but somewhat narrower as will be discussed later. The two parallel vertical opposite side edges of valve 58 are slidably received and confined within a vertical guideway 63 in part 16, corresponding to guideway 62 for plate 59.

The two slide valves 58 and 59 are connected together at their lower ends for movement upwardly and downwardly in unison. This connection between the two valves may be provided by stamping valves 58 and 59 from a single piece of sheet metal, having a horizontal portion 77 within body chamber 30 extending between the bottom edges of the two valve plates.

For actuating valves 58 and 59 in unison between their maximum closed and their maximum open positions, I provide an actuating shaft 73 within the previously mentioned chamber 30 in the forward portion of housing 15, with shaft 73 being journalled for rotary adjusting movement by a pair of bearings 74 and 75. The rotary axis 76 of shaft 73 is parallel to axis 33. Within chamber 30, shaft 73 rigidly carries an arm 78, projecting radially of axis 76, and typically having an enlarged hub portion 79 for attaching the arm to the shaft. At its free end, arm 78 carries an axially projecting short pin or lug 80, which is received and confined within a slot 81 in one of the valve plates (typically plate 59 as shown), in a relation such that swinging movement of arm 78 about axis 76 serves to cam both of the valve plates upwardly and downwardly in unison. The slot 81 in valve plate 59 is of the configuration represented in FIG. 3. More specifically, starting from the righthand end of that slot as seen in FIG. 3, the elongated slot first curves gradually downwardly as it advances to the left, and to a point 84 at which the slot then returns abruptly upwardly to its other end 85. When arm 78 is in a directly upwardly projecting position, lug 80 is received in the righthand end 86 of slot 81, and the valve plates 58 and 59 are in their uppermost positions. As arm 78 swings in a counterclockwise direction as seen in FIG. 3, lug 80 advances along slot 81 toward its other end 85, and in so doing causes the valves to be shifted progressively downwardly. When arm 78 has turned through a ninety degree angle, and reaches a horizontally projecting position (projecting to the left in FIG. 3), pin 80 is received within the very end portion 85 of slot 81, and the valves are then in their lowermost positions (in which shaft 73 and hub 79 may be received within a suitable notch or recess 200 formed in the sliding valve part 58, 59, 77). The design of the valves and slot 81 is such that, in turning through the defined ninety degree angle, the effective light passing area of each of the valves increases in geometric progression steps while the angular movement of arm 78 advances through only arithmetic progression steps. More specifically, for each fifteen degrees of angular movement of arm 78, the effective light passing area of each of the valves is doubled. A slot of the type illustrated in FIG. 3 at 81 will attain this result, in conjunction with the fact that, as the arm approaches a horizontally projecting position, the vertical component of movement for each fifteen degree actuation of the arm increases progressively.

To actuate shaft 73, and thereby valves 58 and 59, there is connected to the forward end of shaft 73, at an exposed location in front of wall 31, a manually movable thin plate like element 87 (see FIGS. 1, 2, 4 and 8), which may take the form of a segment of a circle having a peripheral edge 88 received adjacent and movable along an arcuate similarly curved edge 89 formed on a curved element 90 attached stationarily to the front of wall 31. Part 87 is rigidly attached to shaft 73, and carries a series of markings 91 spaced along its peripheral edge and coacting with a series of markings 92 formed on part 90. The markings 91 may represent the photographic exposure factor of shutter time, typically given in terms of different numbers of frames per second as shown in FIG. 4, in the case of a motion picture camera. Markings 92 may take the form of a film sensitivity scale, representing different film sensitivities typically between ASA–10 and ASA–160. The angular spacing between the different markings 10, 20, 40, 80 and 160 on element 90 should be uniform, typically fifteen degrees spacing between each pair of successive numbers, and the markings 8, 16, 32 and 64 on part 87 may be similarly spaced uniform distances apart, and the same angular distance as the markings 92 (fifteen degrees).

For switching the photoelectric cell circuitry between three different possible conditions, I provide a selector switch 93 (see FIGS. 8 and 9) which is actuable manually to three different settings. This switch 93 is mounted in a laterally projecting portion of the light receiving head 16, and includes an externally cylindrical rotor 94 formed of a suitable preferably rigid insulative material, typically a resinous plastic material. This rotor 94 is rigidly mounted on a shaft 95, which is mounted by suitable bearings represented at 96 for rotation about an axis 140 typically extending parallel to axis 24. At its forward end, shaft 95 projects through a plate 195 mounted stationarily on the front of receiving head 16, and the shaft carries at the forward side of plate 195 a knob 196 having a pointer 97 movable to three different settings designated "R," "I," and "B" (indicating respectively that the reflected light cell, the incident light cell or both are in use).

Adjacent the rotor 94, there is mounted within head 16, and in fixed relation thereto, an insulative member 98, which carries four resilient electrical contacts 99, 100, 101 and 102. These four contacts coact with six metal contacts 103, 104, 105, 106, 107, and 108, which are embedded within shallow recesses formed in the surface of the cylindrical rotor 94, and which engage the four spring contacts 99, 100, 101, and 102 in different positions of the rotor. Aligned in rows with the contacts 103 through 108, the rotor 94 has in its outer surface a number of small localized detent recesses or depressions 109, positioned to be engaged in detenting relation by small downwardly projecting lugs or dimples 110 of contacts 99 through 102.

In the setting of rotor 94 which is represented in FIG. 9, pointer 97 is at the "B" or both cell position, while the contact 99 is in engagement with contact 103, and contact 110 is in engagement with contact 104. The two intermediate resilient contacts 100 and 101 do not electrically engage any of the contacts on rotor 94, but instead have their dimples or lugs 110 received within two of the notches 109 in the rotor, to releasably detent the rotor in the illustrated position. In the next successive position of the rotor (the "I" position), contacts 99 and 101 engage contacts 105 and 106 respectively while contacts 100 and 102 are received within two of the detent notches. In the third or "R" position of the rotor, contacts 100 and 102 engage contacts 107 and 108, while contacts 99 and 101 engage two of the notches 109 in detenting relation.

Within the interior of insulative rotor 94, there are embedded electrical conductors represented diagrammatically by broken lines 111 in FIG. 9, which conductors connect certain of the contacts to one another or to external electrical components. For example, contacts 107 and 108 are electrically connected to one another by one of these insulated wires 111, and similarly contacts 105 and 106 are connected to one another. The contacts 103 and 104 are connected in a series circuit to a resistor 112 and a thermistor 113. With reference to the spring contacts 99 through 102, contact 99 is connected by lead 244 as seen in FIG. 8 to the negative masking electrode 37 associated with incident light photoelectric cell 35. Contact 100 is connected through a series connected resistor 114 and thermistor 115 to the positive side of the moving coil of electrically operated device 41. Similarly, contact 101 is connected through a resistor 116 and thermistor 117 to the negative side of the coil of unit 41. Contact 102 is connected by the lead 241 to the positive electrode associated with photovoltaic cell 34. As will be understood, head 16 contains a suitable cavity at the location of switching mechanism 93, dimensioned to receive and properly mount this switch structure. Also, the head 16 and other parts of the apparatus contain such passages as are necessary to pass the different wires of the FIG. 8 circuit to and from the photoelectric cells, switch structure, and moving coil device 41.

The moving coil device 41 acts when energized to turn a driven shaft 215 and a carried gear 216. The iris mechanism 42 which is driven by gear 216 may include a second gear 217 meshing with gear 216, and also meshing with teeth formed on the periphery of two iris discs 118 and 119. These discs are mounted to turn about axes which are parallel to one another but offset relative to one another, so that a pair of circularly advancing tapered apertures 120 in the two discs will coact to form at 121 an aperture whose effective size varies in response to rotation of discs 118 and 119 resulting from actuation of electrically operated unit 41. This type of iris mechanism is illustrated only as one typical form of iris structure which can be employed, it being understood however that any type of electrically operable iris mechanism can be substituted. The light passing aperture 121 formed by the two coacting closely adjacent discs 118 and 119 is aligned with the lens 12 which is in active position, so that the image from lens 12 passes through aperture 121 and then through the usual shutter mechanism diagrammatically represented at 122, and on to a film which is moved into position by the usual film advancing mechanism diagrammatically represented at 123.

In order to allow maintenance of the iris mechanism in a particular set position irrespective of changes in the light energization of the photoelectric cells, I provide a latch element 124 (see FIG. 8), which is pivoted by a shaft 125 for rotation about an axis typically parallel to axes 23, 24, and 33, and which has an arm 126 whose end is engageable with the teeth of gear 216 to lock the gear against rotation. A suitable spring detent element 127 may be provided for releasably retaining the rotatably movable latch element 124 in either its active of released position. The main body portion of latch element 124 may be circular as shown, and have a portion of its periphery projecting outwardly through an aperture in the side of the camera housing 15, as seen in FIG. 1, so that the latch element may be actuated manually between active and released positions by manipulation of this outwardly projecting portion of the latch element.

To now describe the manner of use of the first form of the invention shown in FIGS. 1 through 9, assume first that it is desired to take motion pictures with the camera using both incident light and reflected light actuation simultaneously, and using a film having an ASA sensitivity of say 10. Also assume that the pictures are to be taken at the standard speed of sixteen frames per second (indicating a particular shutter time corresponding to this sixteen frame per second speed). In order to preset valves 58 and 59 for these conditions, the user merely turns control element 87 at the front of the camera to the position represented in FIG. 4, in which the marking designating sixteen frames per second is located opposite and in exact alignment with the marking designating a film sensitivity of 10 on the ASA scale. This movement of element 87 acts through arm 78 to move plates 58 and 59 vertically in unison to proper positions for taking motion pictures under the indicated conditions. Next, the operator turns knob 196 to the "B" position represented in FIG. 9, in order to connect both of the photovoltaic cells 34 and 35 in series to the coil of moving coil device 41. This series circuit extends from the negative side of moving coil device 41 through lead 243 to negative electrode 36 of cell 34, then through cell 34 to its positive electrode which is connected by lead 241 to contact 102 of switch 93, then from the engaged contact 104 through thermistor 113 and resistor 112, through contacts 103 and 99 of the switch and through lead 244 to negative masking electrode 37 of incident light cell 35, then through that cell and lead 242 to the positive side of device 41. By virtue of this series circuit, the two cells 34 and 35 produce an output which is dependent upon the energization of both cells, as altered by the resistor 112 and thermistor 113 which are also connected into the series circuit.

In order to take pictures after the apparatus has been set as discussed above, the operator merely points the lens 12 in the direction of the desired scene, views the scene through viewfinder eyepiece 20 and window 21, and commences operation of the shutter and film advancing mechanism at the desired time. The iris mechanism 42 is automatically adjusted by electrically operated moving coil unit 41 in accordance with the amount of incident light which passes through incident light acceptance unit 18 to cell 35, and the amount of reflected light which passes through reflected light acceptance unit 17 to cell 34. These two cells develop together an electric current which, as altered by the resistor 112 and thermistor 113, is just sufficient to actuate unit 41 to provide the proper lens aperture 121 for producing an optimum photograph under the particular incident light and reflected light conditions then encountered, assuming of course the shutter speed and film sensitivity for which control 87 has already been set.

If it is now desired to take pictures utilizing only reflected light actuation of the iris mechanism, the operator merely turns switch 93 to the "R" position, and continues to take pictures in the same manner as previously. This connects reflected light responsive cell 34 into a series circuit with resistor 114, thermistor 115, and the coil of electrically operated device 41. This circuit extends from the negative side of device 41 through lead 243 to cell 34, then through lead 242 and through contacts 102, 108, 107 and 100 of switch 93, and through resistor 114 and thermistor 115 to the positive side of device 41. In this condition of the apparatus, cell 34 acts to develop an electric current which is proportional to the energization of the cell by reflected light, and that current actuates device 41 and the iris mechanism 42 to automatically adjust the lens aperture setting in accordance with such reflected light energization.

When it is desired to use only incident light actuation of the device, then switch 93 is turned to the "I" position, to connect cell 35 into a series circuit with the coil of device 41, and resistor 116 and thermistor 117. This series circuit extends from the negative side of device 41 first through thermistor 117, then resistor 116, then contacts 101, 106, 105 and 99 of switch 93, and then through lead 244 and through cell 35 and back through lead 242 to the positive side of the coil of device 41. In this condition, the current generated by cell 35 as a result of the impingement of incident light thereon acts to atomatically adjust iris mechanism 42 to proper settings for taking pictures under the particular incident light conditions encountered.

The transmission characteristics of the two light acceptance units 17 and 18, and of the two valves 58 and 59, as well as the sensitivities of the two cells 34 and 35, and the values of the different resistors and transistors, are all predesigned and so related that the single setting of control element 87 properly presets both of the valve elements in a manner such that either incident light or reflected light actuation, or both together, may be employed for the same valve setting. That is, if the control element 87 is in the setting of FIG. 4, then the valves are properly preset for sixteen frames per second and film of 10 ASA sensitivity, regardless of which of the three possible settings of switch 93 may be selected.

Preferably, the various components of the apparatus are so designed and interrelated that, when an "ideal" photographic scene is encountered, the moving coil unit 41 and iris mechanism 42 will be automatically actuated to exactly the same setting for all three of the different settings of switch 93 (so long as the camera lens remains directed toward the scene). For this purpose, an "ideal" photographic scene is considered to be one which will reflect between about fifteen and twenty percent (desirably eighteen percent) of the available light toward the camera, with the scene being entirely front lighted (no back lighting or side lighting), having medium tones in both the foreground and background, and with the lighting which is incident at the camera location being essentially the same as that incident at the subject location. Under such conditions, unit 41 and iris mechanism 42 are actuated to exactly the same setting regardless of whether both of the photovoltaic cells are utilized in their combined series circuit, or only one of the cells is used in its individual circuit. This result is achieved by proper selection of the photovoltaic cells 34 and 35, proper relationship between the sizes of the apertures within elements 36 and 37, and proper selection of the values for the different resistors and thermistors 112, 113, 114, 115, 116, and 117. The purpose of resistors 112, 114 and 116 is to introduce into each of the three possible electrical circuits (in the R, I and B positions of switch 93) an appropriate resistance in series with the moving coil device 41 and the active cell or cells, which resistance acts in each instance to add extra resistance to the photocell circuit, and thereby gives the desired relationship between energization of cell and movement of coil. Proper selection of relative values for these resistors will also serve to offset the minor departures from standard output that may be encountered in run-of-the-mill cells, thus aiding in manufacture. The purpose of the different thermistors 113, 115 and 117, in their respective circuits, is to introduce into each circuit an automatically thermally controlled change in resistance, which is just sufficient to counteract the thermally caused changes in electrical output from the photovoltaic cells 34 and 35. Thus, changes in temperature do not affect the operation of the device.

At first thought, it might appear that interconnection of the two photovoltaic cells 34 and 35 in series with one another and with moving coil device 41, in the "B" setting of switch 93, would necessarily result in an excessive energization of unit 41 as compared with the energization when only one of the cells is used by itself. However, it has been discovered that the internal resistance characteristics of conventional photovoltaic cells such as are shown at 34 and 35 in the drawings vary in a manner such that connection of two similarly light energized cells in series does not double the output, but instead results in the same output as if one of the cells were used alone. Thus, if I so design the apparatus that under a given "ideal" photographic situation, as discussed above, the incident light which energizes cell 35 will produce the same deflection of unit 41 (when the cell 35 is used separately) as does the reflected light which energizes cell 34 (when that cell is used separately), then if the two cells are connected together in series by movement of switch 93 to the "I" position, the two cells together will still actuate unit 41 to exactly the same setting as when both cells were used separately. The increased potential which has been generated by the use of two cells together is dissipated by the increased internal resistance of the two cells in combination to an extent preventing the development of any greater current flow through the moving coil device 41. This result may be made completely precise by selection of a suitable resistance value for resistor 112 which is connected into the two cell series circuit.

As has been mentioned previously, the primary advantage of the two cell series connected circuit resides in its capacity for automatically responding properly to photographic scenes which are not "ideal" scenes. Consider for example a situation in which the two cells are being used in series, but in which the background of the scene is composed of relatively light areas, whereas the foreground is composed of medium tones or darker areas. In such a situation, the reflected light cell if used alone would result in a very serious underexposure of the foreground subject, because of undue influence on the reflected light apparatus by the large background area. If the incident light cell were employed alone, it would result in a slight overexposure of the background. When the two cells are used in series, however, the high degree of energization of the reflected light cell automatically modifies the iris actuation which would be produced by the incident light cell alone, and thereby actuates the camera lense to an optimum compromise f-stop setting for the particular foreground and background circumstances which are encountered. The reverse occurs if the background is unusually dark, in which case the reduced energization of the reflected light apparatus modifies the output of the incident light cell in the other direction. In this way, the two cell circuit is able to produce the optimum lens setting under almost all photographic conditions. If circumstances are encountered in which it is desired to use either of the cells individually, then the switch 93 is merely actuated to an appropriate setting for use of that particular cell by itself.

With regard to the sensitivities of the cells 34 and 35 per se, it is desirable that these cells be so designed that, in all settings of the valves, a predetermined essentially constant ratio is maintained between the effective relative sensitivities of the reflected light cell and the incident light cell (as altered by the masking elements 36 and 37). For best results, it is preferred that the reflected light cell without light collector be between about 2.5 and 4 times (desirably 3 times) as sensitive to a given intensity of illumination as is the incident light cell without light collector, that is, the electrical current developed by the reflected light cell when used separately should be between about 2.5 and 4 times that developed by the other cell when used separately. Since the two cells 34 and 35 are actually identical in the preferred arrangement, and therefore have the same sensitivity per unit area, this means that the exposed area (unshielded by element 36) of the reflected light cell should be between about 2.5 and 4 times (desirably about 3 times) as great as the exposed area (unshielded by element 37) of the incident light cell in any particular setting of the valves. The narrowed elliptical aperture 237 within mask 37 is so related to the circular aperture 236 of element 36 as to achieve this purpose. Stated differently, the horizontal width of aperture 236 in element 36 at any particular height should be between about 2.5 and 4 times (desirably about 3 times) the width of aperture 237 in element 37 at the same height.

If a situation is met in which it is felt that an incident light type of actuation should be employed, but the incident light measurement should be taken at the location of the photographic subject, then the operator merely takes the camera to that location, holds the camera in a position in which it is pointing in the same direction in which it will be pointing when the picture is ultimately taken, and then actuates lock element 124 to releasably latch the iris mechanism in the position to which it is set by the amount of incident light falling on dome 18 at that subject location. With the iris then locked in the proper setting, the photographer may return to the desired camera location, and take the picture with the iris secured in its proper setting.

It is contemplated that, in manufacturing the device of FIGS. 1 through 9, slight variations in sensitivity as between different run-of-the-mill cells (34 and 35) may be compensated for by varying slightly the ratio between the widths of apertures 236 and 237 of FIGS. 6 and 7. If cell 35 is slightly more sensitive than cell 34 per unit area, then the aperture 237 in element 37 may be made slightly narrower than if the sensitivities were equal. It is also noted that the width of slit 67 in valve 59 should be greater than the width of slit 68 in valve 58, and in the same ratio as that between the widths of apertures 236 and 237.

FIG. 10 represents fragmentarily a variational form of the invention in which the camera is semi-automatic, rather than being completely automatic. In this form there is represented at 41a an electrically actuated moving coil device corresponding to that shown at 41 in FIG. 8, and which device has associated with it all of the light acceptance apparatus, photoelectric cells, valves and selector switch apparatus shown in FIG. 8, except that unit 41a does not directly actuate the iris mechanism. Instead, the unit 41a merely actuates a pointer 127, with which the photographer may manually align a second pointer 128 by means of a manually actuable gear wheel 129 typically located at the front of the camera. This gear 129 and pointer 128 are mounted by a shaft represented at 130 for rotary adjusting movement about the axis 131 about which pointer 127 turns. Actuation of gear 129 and pointer 128 in turn actuates a meshing gear 132, which operates a conventional iris mechanism within the lens assembly 133 of the camera. The operator uses the camera of FIG. 10 in the same manner as that of FIGS. 1 through 9, except that, when the camera is properly positioned and preset for the taking of a picture, with switch 93 and actuating element 87 properly preset, then the operator actuates control gear or knob 129 to align pointer 128 axially with the position to which pointer 127 has been turned by electrical light induced actuation of unit 41a, to in this way set the iris mechanism to a setting corresponding to that which is automatically attained by the mechanism 42 of the FIG. 8 arrangement.

FIG. 11 represents diagrammatically a meter device which may be considered to include all of the components illustrated in FIG. 8, except that the moving coil device 41 is not a portion of an automatic or semi-automatic camera, but instead merely actuates a pointer 127b, which is movable to different positions along an f-stop or other scale 128b from which the operator takes a meter reading for use in setting a camera. The moving coil device itself is represented at 41b in FIG. 11, and is electrically connected into the same cell and switch circuits shown in FIG. 8. Also, the valve of FIG. 8 may be employed in the meter device. In taking readings with the meter, the light acceptance units are oriented in the same manner with respect to the scene as when a camera is employed, so that reflected light acceptance unit 17 is directed toward the scene, and incident light acceptance unit 18 is directed away from the scene. The switch corresponding to switch 93 of FIG. 8 can then adapt the meter for use of either of the cells separately, or for use of both of the cells together and in series.

I claim:

1. A photographic device comprising a body, a reflected light acceptance structure carried by said body and facing in a first direction, an incident light acceptance structure carried by said body and facing in essentially the opposite direction, two photo-voltaic cells in the form of discs positioned in the path of light received by said two light acceptance structures respectively to respond to reflected light and incident light respectively, two plate like valves positioned in front of said two cells respectively and slidable into and out of the paths of light to said cells to vary the passage of light thereto, a single control for actuating said valves in unison, and a mask positioned in front of one of said cells and having an essentially oval light passing aperture narrower than the light energized portion of the other cell and in a relation maintaining a predetermined essentially constant ratio between the effective widths of the two cells at corresponding points therealong.

2. A photographic device comprising a body, a reflected-light acceptance system carried by said body and including a reflected-light collector facing in a first direction at a location to receive light approaching said device from a photographic scene offset in said first direction from the device, said system including a first photoelectric cell positioned to receive and respond to light from said reflected-light collector, an incident-light acceptance system carried by said body and including a translucent convex incident-light collector facing in a direction essentially the opposite of said first direction at a location to accept light approaching said device from a remote light source offset from the device in said opposite direction; said incident-light acceptance system including a second photoelectric cell positioned to receive and respond to light from said incident-light collector, an electrically operated unit responsive to said cells, and electrical circuitry connecting said unit to both of said cells at the same time in a relation to be controlled thereby, said circuitry including switching means operable between a first condition in which said two cells are simultaneously connected in series to said unit, in a relation in which the effect produced by energization of one cell adds to the effect produced by energization of the other cell, and two additional conditions in which said two cells respectively are connected separately in operational relationship to said unit to control it separately.

3. A photographic device as recited in claim 2, in which said circuitry includes a first thermistor and resistor connected in series with one of said cells when only that cell is in use, a second thermistor and resistor connected in series with the other cell when only it is in use, and a third thermistor and resistor connected in series with both cells when both are in use together.

4. A photographic device as recited in claim 2, in which said first photoelectric cell is between about 2.5 and 4 times as sensitive to a given intensity of illumination as is said second cell.

5. A photographic device comprising a body, a reflected light acceptance structure carried by said body and facing in a first direction to accept and respond to light approaching said device from a photographic scene offset in said first direction from the device, an incident light acceptance structure carried by said body and facing in essentially the opposite direction at a location to accept and respond predominantly to light approaching the device from a remote light source offset from the device in said opposite direction, two photo-voltaic cells positioned in the path of light received by said two light acceptance structures respectively to respond to reflected light and incident light respectively, two adjustable light valves positioned in the path of light to said two cells respectively, a single valve control for actuating said two valves in unison, an electrically operated unit responsive to said cells, and electrical control circuitry connecting said unit to both of said cells in a relation to be controlled thereby, said circuitry including switching means operable between a first setting in which said two cells and said unit are all connected in series in a relation such that both cells simultaneously affect said unit with their effects being additive upon simultaneous light energization of the cells, and two additional settings in which said two cells respectively are operatively connected separately to said unit to control it separately.

6. A photographic device as recited in claim 5, in which the light passing characteristics of said two acceptance structures and the sensitivities of said two cells are so related that, if said reflected-light acceptance structure is pointed toward a front lighted scene having a predetermined average reflectance between about 15 and 20 percent, with the lighting which is incident at said device being essentially the same as at the subject location, then in any selected setting of said valves both of said two cells when used separately will actuate said unit to the same setting as when they are connected together in additive series relation.

7. The combination comprising a camera including a housing and a lens facing in a predetermined direction relative to the housing, a reflected-light acceptance system carried by said housing and including a reflected-light collector facing in the same direction as said lens at a location to receive light approaching said device from a photographic scene offset in said first direction from the device, said system including a first photoelectric cell positioned to receive and respond to light from said reflected-light collector, an incident-light acceptance system carried by the housing and including an incident-light collector facing in a direction essentially the opposite of said first direction, at a location to accept light approaching said device from a remote light source offset from the device in said opposite direction, said incident-light acceptance system including a second photoelectric cell positioned to receive and respond to light from said incident-light collector, an electrically operated unit for exposure control carried by the camera and responsive to said cells, an iris mechanism for controlling the passage of light through said lens and automatically actuable by said electrically actuated unit in response to the light energization of said cells, and electrical circuitry connecting said unit to both of said cells at the same time in a relation to be controlled by both cells simultaneously and with the effects of the cells being additive upon simultaneous light energization.

8. The combination as recited in claim 7, including two adjustable light valves positioned in the path of light to said two cells respectively, and a single valve control for actuating said two valves in unison.

9. The combination comprising a camera including a housing and a lens facing in a predetermined direction relative to the housing, a reflected-light acceptance system carried by said housing and including a reflected-light collector facing in the same direction as said lens at a location to receive light approaching said device from a photographic scene offset in said first direction from the device, said system including a first photoelectric cell positioned to receive and respond to light from said reflected-light collector, an incident-light acceptance system carried by the housing and including an incident light collector facing in a direction essentially the opposite of said first direction, at a location to accept light approaching said device from a remote light source offset from the device in said opposite direction, said incident light acceptance system including a second photoelectric cell positioned to receive and respond to light from said incident-light collector, an electrically operated unit for exposure control carried by the camera and responsive to said cells, an iris mechanism for controlling the passage of light through said lens and automatically actuable by said electrically actuated unit in response to the light energization of said cells, and electrical control circuitry connecting said unit to both of said cells in a relation to be controlled thereby, said circuitry including switching means operable between a first condition in which said two cells are simultaneously connected in series to said unit, in a relation in which the effect produced by energization of one cell adds to the effect produced by energization of the other cell, and two additional conditions in which said two cells respectively are connected separately in operational relationship to said unit to control it separately.

10. The combination as recited in claim 9, including two adjustable light valves positioned in the path of light to said two cells respectively, and a single valve control for actuating said two valves in unison.

References Cited in the file of this patent

UNITED STATES PATENTS

| | | |
|---|---|---|
| 2,163,737 | Prinsen | June 27, 1939 |
| 2,261,532 | Tonnies | Nov. 4, 1941 |
| 2,378,433 | Riszdorfer | June 19, 1945 |
| 2,388,609 | Ericsson | Nov. 6, 1945 |
| 2,389,617 | Freund | Nov. 25, 1945 |
| 2,509,366 | Perlin | May 30, 1950 |
| 2,824,696 | Norwood | Feb. 25, 1958 |
| 2,841,064 | Bagby et al. | July 1, 1958 |
| 2,879,690 | Dunn | Mar. 31, 1959 |
| 2,975,693 | Ort | Mar. 21, 1961 |